United States Patent [19]

Coffey et al.

[11] Patent Number: 5,211,479
[45] Date of Patent: May 18, 1993

[54] DIGITAL PACIFIER THERMOMETER

[76] Inventors: Frank Coffey, 225 Main St., New Paltz, N.Y. 12561; Paul A. Ruggiero, P.O. Box 698, Stone Ridge, N.Y. 12484

[21] Appl. No.: 819,805

[22] Filed: Jan. 13, 1992

[51] Int. Cl.[5] .................. G01K 7/00; G01K 7/22; G01K 13/00; G01K 1/14; A61B 5/00
[52] U.S. Cl. .................... 374/151; 128/736; 606/234
[58] Field of Search .............. 374/151; 128/736; 606/234, 235, 236

[56] References Cited

U.S. PATENT DOCUMENTS

| | | | |
|---|---|---|---|
| 3,117,450 | 1/1961 | Hoy | 374/151 |
| 3,782,194 | 1/1974 | Brodie et al. | 374/151 |
| 3,913,402 | 10/1975 | Doyle | 374/151 |
| 3,924,621 | 12/1975 | Cassimally | 606/236 |
| 3,968,690 | 7/1976 | Blouin et al. | 374/151 |
| 4,072,054 | 2/1978 | Blouin et al. | 374/151 |
| 4,447,164 | 5/1984 | Berndt | 374/151 |
| 4,511,265 | 4/1985 | Berndt | 374/151 |
| 5,013,160 | 5/1991 | Massey et al. | 374/151 |
| 5,033,864 | 7/1991 | Lasecki et al. | 374/151 |
| 5,109,864 | 5/1992 | Lu | 374/151 |

FOREIGN PATENT DOCUMENTS

| | | | |
|---|---|---|---|
| 0166069 | 1/1986 | European Pat. Off. | 374/151 |
| 0039434 | 4/1981 | Japan | 374/151 |
| 2163855 | 3/1986 | United Kingdom | 128/736 |
| 83/02664 | 8/1983 | World Int. Prop. O. | 128/736 |

Primary Examiner—William A. Cuchlinski, Jr.
Assistant Examiner—Diego F. F. Gutierrez
Attorney, Agent, or Firm—Cushman, Darby & Cushman

[57] ABSTRACT

A pacifier thermometer having one or more electrical sensors within the pacifier nipple and digital measurement and display units external to the nipple is provided. An insulating nipple core can be utilized to improve the speed and accuracy of sensor response. Two or more sensors along with digital logic selection of the highest constant reading can be used to avoid false low readings. Additional conventional features can be provided as well.

11 Claims, 2 Drawing Sheets

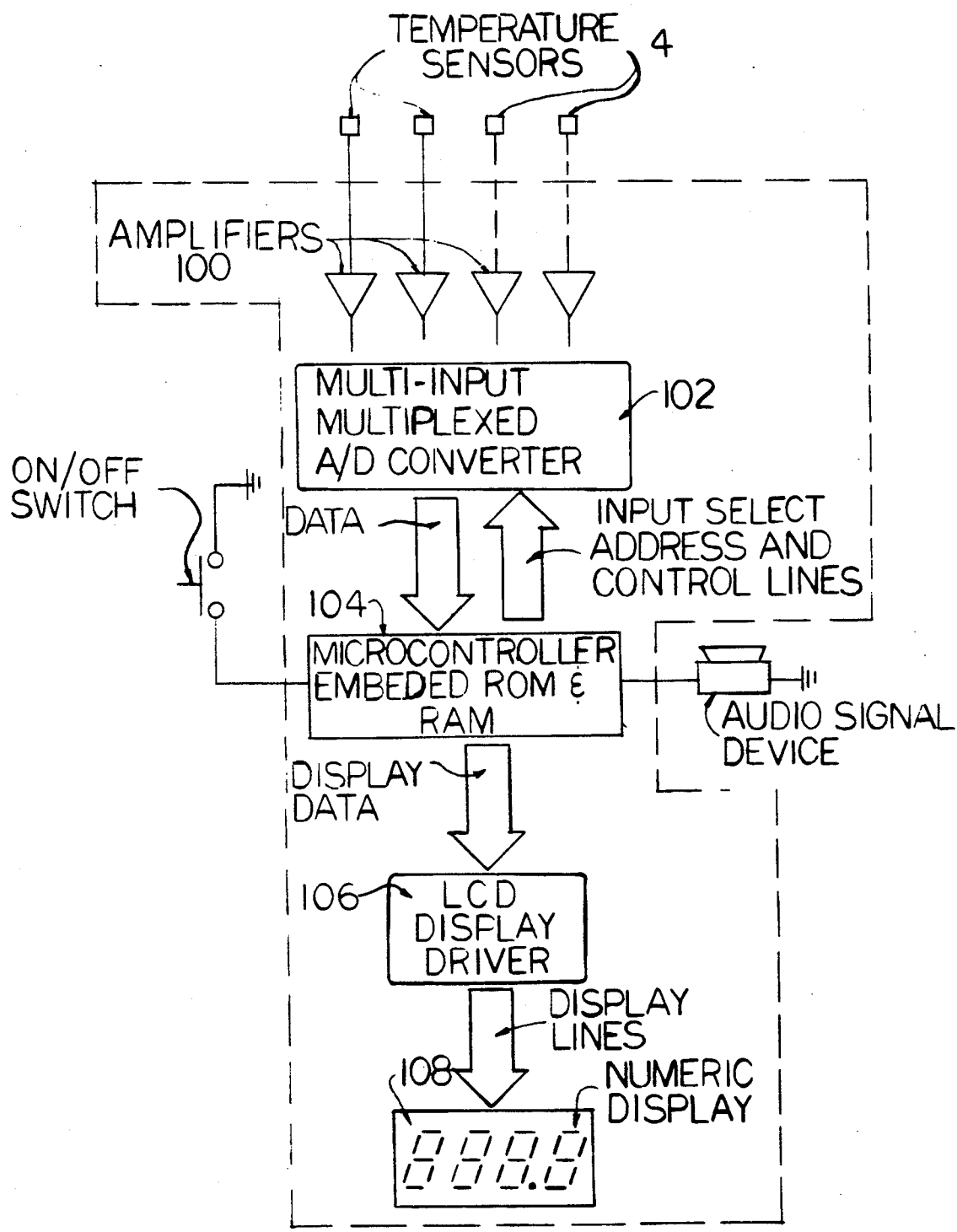

DIGITAL PACIFIER THERMOMETER

BACKGROUND OF THE INVENTION

1. Field of the Invention

This invention relates to a digital thermometer, and more particularly, to a digital thermometer disposed within a baby pacifier nipple.

2. Description of the Prior Art

Recording a baby's body temperature is an essential part of the upbringing, care and preventative needs vital to a child's healthy development. The traditional areas for temperature measurement are rectal, axillary and oral. The oral method is the most precise for the lay person as the other methods require adjustments to the actual readings for an accurate temperature. An oral device is also less intrusive and upsetting to a feverish baby. A pacifier thermometer would act to soothe and calm a child making the procedure easier and resulting in more exact readings.

Several types of pacifier thermometers have been disclosed in the prior art. For example, conventional liquid column thermometers are incorporated into pacifier assemblies in the inventions of Doyle (U.S. Pat. No. 3,913,402), Hoy (U.S. Pat. No. 3,117,450) and Blouin et al. (U.S. Pat. Nos. 3,968,690 and 4,072,054). Berndt (U.S. Pat. Nos. 4,447,164 and 4,511,265) uses temperature sensitive liquid crystal materials in the manufacture of pacifiers which can indicate an abnormally high oral temperature.

Electronic digital thermometers are wellknown and widely used, including use for the measurement of body temperature. Such thermometers have several advantages including fast response time, ease of reading and the lack of mercury or other potentially harmful liquids. It is clear that pacifier thermometers could be substantially improved through the incorporation of electronic digital temperature measurement. However, digital thermometers typically utilize a sensing element mounted inside a metallic shield, the latter being affixed to a rigid probe. This type of assembly is not readily adaptable to a pacifier thermometer.

SUMMARY OF THE INVENTION

It is therefore an important objective of the present invention to provide a pacifier thermometer which utilizes electronic digital temperature measurement.

Another important objective of the present invention is to provide a temperature sensing nipple assembly having fast and accurate response.

One other important objective of the present invention is to provide a pacifier thermometer system which avoids incorrectly low temperature readings due to incomplete contact of the temperature sensing assembly with the oral tissues of the infant by the use of a plurality of temperature sensing members distributed within the assembly.

These objectives are achieved by providing one or more electrical temperature sensors distributed within a pacifier nipple. These are typically thermistors, although other devices, for example, thermocouples or resistance temperature detectors, could also be used. Leads for the sensors are routed to digital measurement and display circuitry which is housed within the pacifier disk and/or a handle attached to the disk. An insulating, low heat capacity nipple core can be provided to improve response time and accuracy. Digital logic can sequentially measure signals from multiple sensors, displaying only the highest reading obtained. This system avoids false low readings caused by incomplete, intermittent, or non-contact of the nipple surface with oral tissues. Conventional digital thermometer features, for example, "auto-off" or audio annunciation of stable readings can be provided.

BRIEF DESCRIPTION OF THE DRAWINGS

A better understanding of the present invention and its advantages will result from studying the following detailed description of a presently preferred embodiment together with the accompanying drawings in which:

FIG. 5 is a diagrammatic representation of the circuitry used to combine the input from the temperature sensor(s) and to display them in usable form.

DETAILED DESCRIPTION OF THE PREFERRED EMBODIMENTS

The invention will now be fully disclosed with reference to the drawings. Specific examples are provided, but no limitation should be construed as to the scope of the invention.

Figure 1:
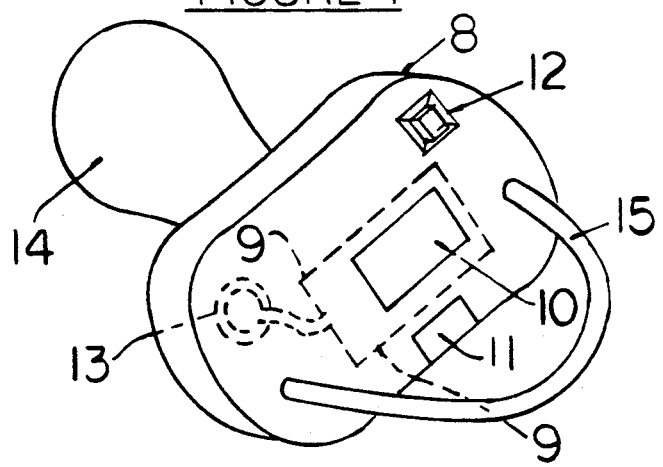
FIG. 1 is a perspective view of a preferred embodiment according to the present invention.

A preferred embodiment of the invention is depicted in FIG. 1. An array of electrical temperature sensing elements 4 (not shown here) is mounted within the pacifier nipple 14, preferably near the nipple surface. These sensors are typically thermistors, but other types may be used. The lead wires 5 (not shown here) pass through the nipple into the guard plate 8 and are connected to the digital measurement/display unit circuitry 9. The latter incorporates an integral LCD display 10 in this embodiment. The guard plate forms the housing for the electrical components, including the measurement/display unit circuitry 9, battery 11, optional audio annunciator 13, and on-off push button switch 12. The audio annunciator may also serve as a speaker which will broadcast a musical melody which may be stored in the circuitry as discussed below. The switch is preferably recessed or more preferably is spring-loaded such that it cannot be inadvertently actuated by the infant. A conventional handle 15 may be provided.

Figure 2:
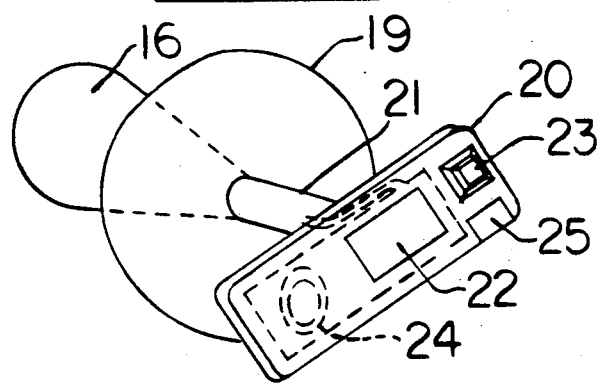
FIG. 2 is a perspective view of another embodiment according to the present invention.

A second embodiment is shown in FIG. 2. A nipple 16 with a temperature sensor 17 (not shown here) and lead wires 18 (not shown here) are provided as before. However, in this case, the lead wires 18 pass through a conventional, typically one piece, guard plate 19, then through a stem 21 and are then connected to the digital measurement/display unit circuitry 22, which is housed in a bar-shaped handle 20. As shown in FIG. 2, the guard plate 19 is fixed to an end of stem 21. Also mounted within the handle are the on-off switch 23, the battery 25, and optionally an audio annunciator 24. Other handle shapes, for example, round, can also be utilized in this embodiment.

The relatively large mass and generally low thermal conductivity of a pacifier nipple can cause embedded temperature sensors to exhibit slow and potentially inaccurate response. This problem can be overcome through the use of an insulating nipple core and an outer nipple sheath as shown in FIG. 3.

When a pacifier nipple is held within an infant's mouth, all of the nipple surface is not always in good contact with the oral tissues. As a result, a temperature sensor may indicate an inaccurately low reading because it is not is contact with the oral tissues. This difficulty can be overcome through the use of multiple temperature sensors which are spaced apart from one another so as to be distributed about a circumference of the nipple and digital logic, as in the preferred embodiment, which automatically selects and displays the appropriate sensor reading. The temperature sensors are advantageously distributed about the circumference of the nipple at its widest diameter.

Figure 3:
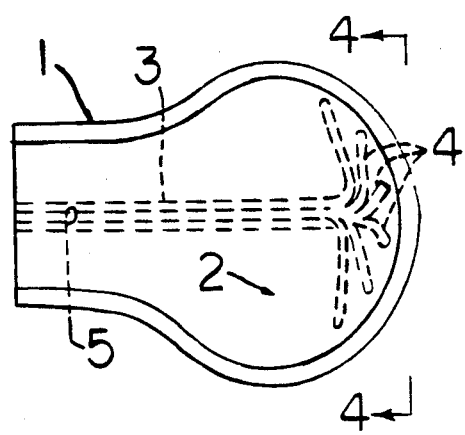
FIG. 3 is cross-sectional view of a nipple/temperature sensor assembly incorporating an array of six sensors.
Figure 4:
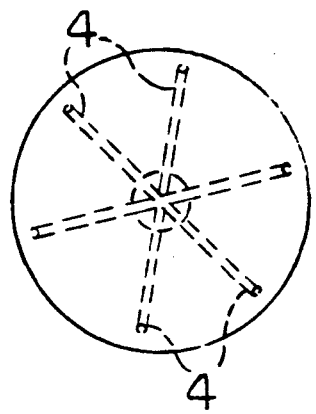
FIG. 4 is an end view of the same temperature sensor assembly in FIG. 3 taken along line 4—4.

A cross-section of a such a nipple/temperature sensor assembly provided with an array of multiple temperature sensors 4 is presented in FIG. 3. The outer sheath 1 is formed from a suitably soft and flexible rubber or similar material. A substance having a high thermal conductivity is advantageous. The core 2 is preferably made from a flexible, resilient foam material having a low thermal conductivity and low heat capacity. These properties substantially reduce the net amount of heat transfer required to bring the temperature sensing elements 4 to a near equilibrium condition. Those skilled in the art will recognize that this effect will promote both rapid response and accurate temperature readings. Simultaneously, a flexible, resilient core provides the nipple with a "feel" which is well accepted by the infant. A passage 3 may be provided in the core through which the lead wires 5 can pass. Alternatively, the lead wires can be routed through between the sheath and the core. It is preferable that some excess lead wire be provided, in order to avoid strain as the assembly is flexed within the infant's mouth. FIG. 4 is an end view of the nipple/temperature assembly seen along ling 4—4 in FIG. 3. As can be readily seen in FIG. 4, the temperature sensing elements 4 are placed circumferentially about the nipple, and are preferably embedded within the sheath, although they can be placed between the sheath and the core.

The lead wires from the sensors are connected to a digital measurement unit as previously described. FIG. 5 is a diagrammatic representation of the electronic circuitry utilized in the present invention. As shown in FIG. 5, temperature sensing elements 4 are connected to a corresponding amplifier 100. Connected in series to the amplifiers 100 is a multi-input multiplexed A/D converter which outputs, to a microcontroller 104, digital signal data representative of a temperature output of one of the temperature sensors 4 in response to an input select address and control signals from microcontroller 104. FIG. 5 shows the micro controller 104 serially connected to the multi-input multiplexed A/D converter 102 and LCD display drives 106. Microcontroller 104 is also shown to contain an embedded Rom and Ram, and is connected to both an ON/OFF switch and an audio signal device. The LCD display driver 106 drives a numeric display 108. The microcontroller 104 is provided such that the signals from each of the sensors 4 is repeatedly tested in sequence and only the highest comparative temperature is displayed. Thus, this system automatically selects a sensor 4 which is in good thermal contact with the oral tissues and avoids indicating an inaccurately low reading.

More specifically, in operation, the user would depress the "thermometer on" push button, thereby readying the unit to measure the infant's temperature. At power-on, temperatures will be shown in a default unit scale on numeric display 108. However, the user may select a different temperature scale (e.g. Fahrenheit or centigrade). Should the user depress the "thermometer on" push button again within a brief time after the initial depression of the button, the temperature display units will change from the default unit to a newly selected temperature unit. This newly selected temperature unit will be stored in a non-volatile memory location of microcontroller 104, and would become the default temperature unit.

After the pacifier thermometer is inserted into the infant's mouth, the microcontroller 104 will continuously read the temperature sensor(s) 4, comparing each sensor value and saving the highest value among them. When the temperature measured is greater than the lowest probable body temperature and remains stable for some period of time, the temperature is displayed, and, optionally, a child's melody will play indicating that the measurement is finished. The child's melody may be stored in the read only memory portion of the microcontroller 104 illustrated in FIG. 5, as is conventional. The thermometer would then remain operational until the temperature sensed by its sensor(s) stabilizes at a temperature less than or equal to some temperature below the lowest probable body temperature and higher than or equal to the probable ambient temperature of the atmosphere around the thermometer for some period of time, after which the unit would automatically shut off.

It is clear that the pacifier thermometers disclosed above can be modified and improved in a number of conventional ways. Liquid crystal digital displays will typically be used, but other indicators such as light emitting diodes or even analog displays can be utilized. Simple dynamic temperature indication can be provided, but "delay to stable reading" features will generally be preferred. Audio or visual enunciation of stable readings can be provided. A "hold highest reading" ability is preferable and is easily provided.

Other desirable features are well-known to those skilled in the art, and can be incorporated into the pacifier thermometer.

I claim:

1. A temperature sensing means disposed within a pacifier, said pacifier being provided at a first end with a first portion suitable for insertion into the mouth, a second portion at a second end of said pacifier opposite said first end, wherein said sensing means comprises a plurality of electronic temperature sensing members connected to an electronic circuit means, said circuit means being capable of processing input temperature information received from said plurality of temperature sensing members and transmitting said processed input temperature information to a display means connected thereto, wherein said plurality of temperature sensing members about a circumference of said first portion of said pacifier.

2. The device of claim 1, wherein said temperature sensing members are thermistors.

3. The device of claim 1, wherein said temperature sensing members are mounted in a periphery of said first portion of said pacifier.

4. The device of claim 1, wherein said first portion of said pacifier is provided with an outer sheath and an insulating core, wherein said core is made from a resilient foam material, said sheath and said core being made from materials selected for high and low thermal conductivity, respectively, and high and low heat capacitance characteristics, respectively.

5. The device of claim 1, wherein said electronic circuit means comprises a number of electronic signal amplifiers at a first end of said circuit means corresponding to the number of said temperature sensing members and connected thereto, an analog/digital signal converter, said converter being connected in series to each said amplifiers, a computer microcontroller, said microcontroller being connected in series to said signal converter, and a display driving means at a second end of said circuit means, said microcontroller being connected in series to said display driving means.

6. The device of claim 5, wherein said circuit means is provided with an on-off power switch, and an electrical battery for powering said circuit means.

7. The device of claim 6, wherein said circuit means, said display means, said on-off power switch, and said electrical battery are housed within said second portion of said pacifier.

8. The device of claim 7, wherein said second portion of said pacifier comprises a housing with a handle extending therefrom.

9. The device of claim 7, wherein said second portion of said pacifier comprises a guard plate, said plate being fixedly attached to a first end of a tubular stem or neck, and a housing fixedly attached to a second end opposite said first end of said tubular stem or neck, said housing and said stem or neck being attached perpendicularly so as to form a T-shaped structure.

10. The device of claim 5, wherein said microcontroller inputs temperature information received from said temperature sensing members and compares the received temperature information such that the highest temperature information received that remains constant over an arbitrary period of time is recognized as a highest temperature reading which will be supplied to the display driving means and the display means.

11. The device of claim 10, wherein said pacifier is provided with an audio speaker means and said audio speaker means is triggered by said microcontroller when said highest temperature reading is obtained.

* * * * *